Patented Feb. 4, 1936

2,029,967

UNITED STATES PATENT OFFICE 2,029,967

TREATMENT OF COMMERCIAL DICALCIUM PHOSPHATE

Franciscus Visser't Hooft, Buffalo, N. Y., assignor to Lucidol Corporation, Buffalo, N. Y., a corporation of Delaware No Drawing. Application April 22, 1933, Serial No. 667,495

5 Claims. (Cl. 23—243)

The present invention relates to a process of treating commercial dicalcium phosphate or products containing substantial quantities of commercial dicalcium phosphate of a sufficient degree of purity to be used in edible products, to eliminate the tendency of these products to cake, especially when subjected to summer temperatures and air of high moisture content.

It is a well known fact that the analysis of a sample of dicalcium phosphate for CaO and $P_2O_5$ does not give a true picture of the actual percentage of dicalcium phosphate in the sample. Thus a sample which shows the correct analysis for chemically pure dicalcium phosphate, may still contain considerable quantities of monocalcium phosphate and of tricalcium phosphate, so balanced that the average $CaO:P_2O_5$ ratio indicates pure dicalcium phosphate. A further complication arises from the fact that various hydrates exist of mono-, di- and tri- calcium phosphate, which hydrates are extremely difficult or impossible to identify by chemical analysis and can only be identified through microscopic examination or study of X-ray patterns.

Dicalcium phosphate in the form of precipitated bone phosphate or made from pure phosphoric acid, is used extensively in the arts either as such or in mixtures with other ingredients for various purposes, e. g., in baking powder, in flour bleaching chemicals, in flour phosphating, in dentifrices, etc. In most of these applications it is highly desirable that the dicalcium phosphate be a free running, non-caking material, stable under any ordinary summer or winter temperatures and atmospheric conditions. An accelerated test to test these properties on a particular sample can be made by grinding the sample very fine so as to break up all the larger crystal agglomerates and then subject it to a temperature of 60° C. for a period of approximately 12 hours (or over night) in a closed vessel. During said period, the material should not cake. After that period no traces of free moisture should be noticeable even on short heating to 100° C., and the material should still be absolutely dry, non-caked and free running. Many commercial samples were tested, and no sample of dicalcium phosphate found in the market would stand up perfectly under this test.

I have now found that a commercial dicalcium phosphate which cakes, gives off moisture and is not free running when tested in the above manner, can be made non-caking, dry and free running by the addition of small quantities of certain substances which I will hereinafter refer to as "caking inhibitors".

These substances are such as to act upon the traces of monocalcium phosphate present in the commercial dicalcium phosphate and which my research has indicated to be responsible for the undesirable properties. These traces can be removed, as I proved by actual tests, by an extremely protracted washing of the finely ground material and subsequent careful drying. Such a process would be very expensive and impractical because secondary reactions may set in during the washing process. I proved further that such a washed non-caking, dry, free running dicalcium phosphate can be made caking again by the addition of traces of monocalcium phosphate. Therefore, the source of caking difficulties seems to be the monocalcium phosphate present in various amounts in practically all samples of commercial dicalcium phosphate and even in many samples of so called "C. P." and so called "analytically pure" dicalcium phosphate.

I have found that various chemicals can be used to act in the above capacity as "caking inhibitors". These added substances act upon the traces of monocalcium phosphate which is an acid substance, to convert this into the dicalcium phosphate. Traces of tricalcium phosphate may also be formed. Therefore these inhibitors can be either alkaline substances or salts of weak acids which react with the traces of monocalcium phosphate with the formation of dicalcium phosphate or similar salt. Traces of water and/or weak acids are also formed.

For the purpose of more completely explaining the nature of the invention, the following examples are given, but the invention is not restricted to these specific examples, since not only the substances here referred to can be employed, but other substances having a like effect.

Example 1

A small amount such as 0.1% to 0.8% (e. g. about 0.5%) of calcium oxide is added to and uniformly mixed (e. g. by grinding) with a finely ground precipitated dicalcium phosphate made from bone, which had shown undesirable caking properties in an accelerated test at 60° C. for 12 hours. After incorporation of the calcium oxide the test is repeated and a perfectly dry, non-caking, free running material is found.

*Example 2*

2 to 5% sodium bicarbonate is added to a sample of finely ground commercial dicalcium phosphate produced from pure phosphoric acid (produced from phosphate rock) and which cakes badly during storage at summer temperatures, quickly losing its free-running qualities. The resulting product even under extreme temperature condition can be kept for years without loosing any of its free running qualities and without getting moist or caking.

It will be understood that for certain purposes, excess of an alkaline material should be avoided, but for most purposes the presence of a little tricalcium phosphate in the product is not especially harmful.

Substances which can be used as caking inhibitors include: calcium oxide, sodium borate, calcium acetate, calcium carbonate, sodium salicylate, magnesium carbonate, sodium benzoate.

The selection of the proper substance to add depends of course in each case on the purpose for which the resulting product is to be used. In the present invention I preferably employ inorganic substances, i. e. salts of alkali metals or alkaline earth metals, which are mildly alkaline, (whether these are salts of inorganic acids (carbonic) or of mild organic acids).

I claim:—

1. In the process of producing a non-caking, free-running, dry commercial dicalcium phosphate, of a purity sufficient to be used in edible farinaceous food materials, in compliance with the Federal Pure Food & Drug Act, the step of adding to dry commercial precipitated dicalcium phosphate, of a sufficient degree of fineness to mix uniformly with flour, containing only a very minor proportion of mono-calcium phosphate, a dry non-poisonous caking inhibitor consisting of a substance which will neutralize acidity of any mono-calcium phosphate present, said inhibitor being a compound of an alkali-forming metal, and which substance, ingested in small amounts, is non-injurious to health.

2. In the process of producing a product containing substantial quantities of commercial di-calcium phosphate as a filler, and of a degree of purity sufficient to be used in farinaceous food materials, under the Federal Pure Food & Drug law, the step of adding, to commercial dicalcium phosphate containing small quantities only of mono-calcium phosphate, and thoroughly incorporating with said material, an acid-neutralizing calcium compound in a dry state, such calcium compound being non-poisonous, and the amount of same being sufficient to react with the small traces of phosphate more acid than dicalcium phosphate, and thereby produce a non-caking, free running, dry product, both of said materials being used in a substantially dry condition, and reducing the product to a sufficient degree of fineness to uniformly mix with flour.

3. A process which comprises thoroughly incorporating together commercial dicalcium phosphate, which initially contains substantial traces of mono-calcium phosphate, with an inorganic agent which is a chemical compound of a metal selected from the group consisting of alkali metals and alkaline earth metals, which agent is capable of neutralizing all of said mono-calcium phosphate, both being in a substantially dry condition, and at any suitable stage of the process, reducing such materials to the condition of a very fine free-running powder, whereby the said product is rendered permanently free-running and non-caking.

4. As a new product, a dry pulverulent intimate mixture consisting essentially of commercial di-calcium phosphate, which has been rendered wholly free from mono-calcium phosphate by thoroughly incorporating in dry state, a small percentage of an alkaline reacting material comprising a compound of an alkali-forming metal and which compound, in small amounts, is non-injurious to health, with di-calcium phosphate containing only a small percentage of mono-calcium phosphate, and which product retains its dry pulverulent free-running properties when exposed to summer temperatures, without caking, said product being in a sufficiently finely divided state to readily mix uniformly with dry flour.

5. A flour bleaching chemical, containing as a component, the product as set forth in claim 4.

FRANCISCUS VISSER'T HOOFT.